(12) United States Patent
Ambrosio et al.

(10) Patent No.: US 7,427,156 B2
(45) Date of Patent: Sep. 23, 2008

(54) THERMALLY MANAGED BATTERY ENCLOSURE FOR ELECTRIC AND HYBRID ELECTRIC VEHICLES

(75) Inventors: Joseph Mario Ambrosio, Smithtown, NY (US); Konstantinos Sfakianos, Astoria, NY (US)

(73) Assignee: Odyne Corporation, Hauppauge, NY (US)

( * ) Notice: Subject to any disclaimer, the term of this patent is extended or adjusted under 35 U.S.C. 154(b) by 86 days.

(21) Appl. No.: 11/312,803

(22) Filed: Dec. 20, 2005

(65) Prior Publication Data

US 2006/0132101 A1    Jun. 22, 2006

Related U.S. Application Data

(60) Provisional application No. 60/637,712, filed on Dec. 20, 2004.

(51) Int. Cl.
*G01N 25/02* (2006.01)
*H02J 7/16* (2006.01)
*H02J 7/00* (2006.01)
*H01M 2/10* (2006.01)

(52) U.S. Cl. ................ 374/20; 320/104; 320/150; 429/97; 429/98; 429/99

(58) Field of Classification Search ............ 320/104, 320/150; 429/97–99; 374/20
See application file for complete search history.

(56) References Cited

U.S. PATENT DOCUMENTS

| 5,569,552 | A | * | 10/1996 | Rao et al. ............... 429/72 |
| 5,620,057 | A | | 4/1997 | Klemen et al. |
| 6,220,733 | B1 | | 4/2001 | Gordon |
| 6,653,002 | B1 | * | 11/2003 | Parise .................. 429/7 |
| 2001/0035740 | A1 | | 11/2001 | Palanisamy |
| 2002/0108794 | A1 | | 8/2002 | Wakashiro et al. |
| 2004/0108831 | A1 | | 6/2004 | Cartwright et al. |

* cited by examiner

*Primary Examiner*—Gary L Laxton
*Assistant Examiner*—Yalkew Fantu
(74) *Attorney, Agent, or Firm*—Alfred M. Walker

(57) ABSTRACT

A thermally managed enclosure for batteries in a motor vehicle or other machinery includes a cradle of thermally conductive material for containing a battery. The cradle having a bottom wall and side walls closely fitted to and in contact with the battery, to maintain the battery in a stable position. The bottom wall of the cradle has a passageway trough containing a tube for flowing heating or cooling fluid therethrough, to control the optimal operating temperature of the battery. The passageway trough is preferably filled with a thermally conductive fill surrounding said tube. When two or more batteries are required, an array of adjacent cradles are provided in a monocoque tray formed by bonding or welding the multiple cradles at their adjacent sides. These cradles are optionally connected by linearly extending rods in the cradles

8 Claims, 4 Drawing Sheets

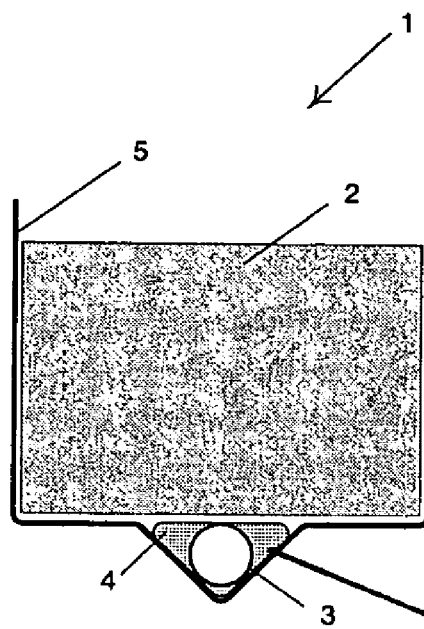
Figure #1
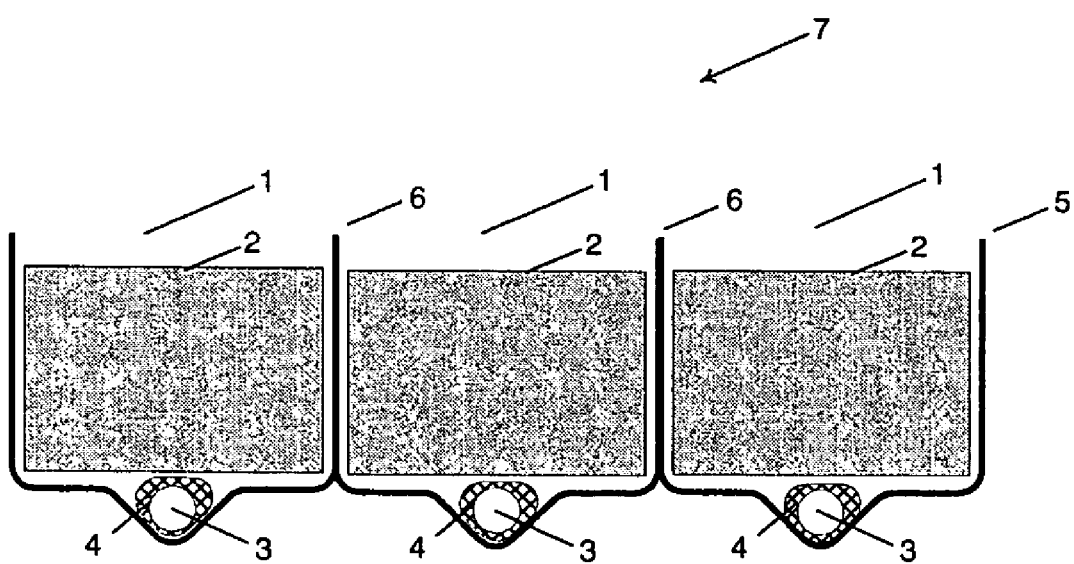
Figure #2

THERMALLY MANAGED BATTERY ENCLOSURE FOR ELECTRIC AND HYBRID ELECTRIC VEHICLES

CROSS REFERENCE TO RELATED APPLICATIONS

This application claims the benefit, Under 35 U.S.C. 119 (e) of U.S. Provisional Application No. 60/637,712, filed Dec. 20, 2004, which is hereby incorporated by reference.

FIELD OF THE INVENTION

The present invention relates to thermally managed battery enclosure for electric and hybrid electric vehicles.

BACKGROUND OF THE INVENTION

The present invention is directed to electric and hybrid electric off-road and on-road vehicles, which use solely a battery pack or a battery and electric generating system to supply energy for propulsion. Such battery packs include multiple battery modules connected in series or parallel. The invention addresses a variety of environmental and technical challenges associated with reliable and long-term battery operation. Vehicles utilizing the invention include electric and hybrid electric buses, trucks, material handling vehicles (forklifts and pallet jacks), neighborhood electric vehicles, and airport support equipment.

OBJECTS OF THE INVENTION

It is an object of the present invention to provide a thermally managed battery enclosure for vehicles and machinery which protects the battery and provides a conductive path for battery heating and cooling for optimal battery performance.

It is also an object of the present invention to maintain a battery at a selected temperature, to regulate the temperature of the battery for optimal performance.

It is further an object to provide a battery enclosure with a heat exchanger for obtaining heat from engine coolant in a vehicle.

It is also an object to provide a structurally sound vehicle battery enclosure which keeps the battery in safely in place.

It is also an object to improve over the disadvantages of the prior art.

Other objects which become apparent from the following description of the present invention.

SUMMARY OF THE INVENTION

In keeping with these objects and others which may become apparent, the present invention is a battery enclosure with a unitized structural skin design (also called monocoque), which encloses the battery from the environment, provides structure, and provides a conductive path for battery heating/cooling as required for optimum battery performance. The battery is heated and/or cooled based on ambient environmental conditions and/or battery temperature conditions such as hot batteries resulting from internal battery resistance or cold batteries resulting from low ambient temperatures.

The aforesaid battery enclosure addresses the following issues:
Protection from the environment (water, humidity, road debris, etc.);
Battery heating in cold weather;
Battery cooling in hot weather;
Location and supporting structure within vehicle;
Maintaining a low temperature differential from battery to battery within the battery tray; and,
Creating a safe and isolated method to integrate and handle a large number of batteries.

The battery enclosure includes a plurality of long cradles constructed of a thermally conductive material, such as aluminum, which are formed to the shape of the battery in order to maximize surface contact with each of the battery's outer surfaces. The battery cradles are shaped and sized based on the battery type and the vehicle configuration. Each cradle is equipped with a passage for a fluid loop, which is the working fluid. The working fluid is heated or cooled (by external means) in order to maintain the battery at its optimum operating temperature.

The working fluid is usually a water-glycol solution and is chilled by tapping into the vehicle air-conditioning system via a coolant-to-liquid heat exchanger; typically the coolant is a type of Freon®. In a motor vehicle environment, the onboard battery management system controls this by engaging the air-conditioning system and appropriate working fluid pumps prior to battery charging. The idea is to thermally correct the batteries before charging begins. This can be engaged during driving under extreme conditions as well. Fluid can be conditioned by external means as well, not only by use of an air conditioner and/or engine coolant. For example, an external chiller and/or heater can be used to condition the glycol working fluid. The working fluid may be either a liquid or a gas, such liquid glycol solutions, for example, ethylene glycol or other alcohols containing two hydroxyl groups, or gaseous or liquid fluorinated hydrocarbons used as working fluids in refrigeration and air conditioning, such as Freon®, for example, as the working fluid. The contact surface is the battery enclosure and the transfer media, which makes more surface contact than just the fluid; it is a solid (i.e. the cradle conditioned by the working fluid).

The working fluid can also be heated by an on board electric heater or using waste heat from other vehicle systems (such as an auxiliary power unit). If the batteries are too cold to charge, the battery management system would engage the electric heater and appropriate fluid pumps to thermally correct the batteries prior to charging for efficient charging. The lower the battery temperature the less efficient the charging. At some temperature the battery cannot be charged at all.

The cradles are assembled into a unitized monocoque tray structure by welding or otherwise fastening each cradle to each other. The working fluid is carried by a conduit, such as a pipe, usually copper, which sits adjacent to the cradle, such as, for example, on the bottom of each cradle within a passageway trough, which may be, for example, a "V" shape trough created within the cradle or other configuration adjacent to a wall of the cradle. Other methods of fluid flow and introduction can be used, other than the V-shape trough at the bottom of a cradle, such as are known to those skilled in the art. For example, a tube can be attached by welding or otherwise in areas other than the bottom of the cradle, or it can be attached by sliding an extrusion on, etc. The conduit, such as a pipe, is preferably installed with thermally conductive potting materials or epoxies. This keeps the conduits, such as pipes, in place while creating a thermal path to the cradles. Although other interconnecting configurations are applicable, preferably each of the conduits, such as pipes, within the cradles are preferably interconnected through a manifold system by connecting the conduits, such as pipes, in parallel. By keeping the cradles bonded to each other and by pumping the working fluid the entire tray is at approximately the same temperature. The cradles are assembled into a unitized tray structure through a bonding process appropriate to the materials used (i.e. welding for metals, adhesives for non-metals) to create the described battery enclosure having the appropriate voltage and amp-hour capacity for a specific vehicle's requirements.

Each cradle is preferably designed to stay secure in place, such as, for example being provided with a fastener means, such as a hole for every battery at the top, which is just above the battery cover. When all the cradles are assembled, the holes of each cradle are in line allowing for a fastener, such as a rod to pass through. This prevents the batteries from moving or falling off the trays in the event of a vehicle flip over. This also adds to the structural strength of the complete tray. By keeping the rod fit tight, it makes the batteries part of the structure.

In general, the thermally managed enclosure for batteries of the present invention includes one or more cradles of thermally conductive material, each cradle containing one or more batteries. Each cradle preferably has a bottom wall and side walls which are closely fitted to, and in intimate contact with, the batteries contained therein, and each cradle is in contact with its respective batteries. The bottom wall of each cradle includes a passageway trough containing a tube or pipe for flowing heating or cooling fluid, such as, for example, a liquid therethrough.

Each passageway trough is filled with a thermally conductive fill surrounding each respective fluid-filled tube or pipe.

The thermally managed enclosure may include multiple cradles for batteries, wherein one or more batteries occupies a single cradle.

When multiple cradles are implemented, the thermally managed enclosure provides the cradles in a side by side configuration, with a fluid pipe in the bottom wall of each cradle. Each fluid pipe is preferably positioned in parallel with an adjacent fluid pipe, and adjacent batteries are bonded at their respective common side walls.

In the thermally managed system for one or more batteries, there is provided a series of passageways, each containing the tube within which flows heating or cooling fluid, such as a liquid. Each respective passageway trough is filled with a thermally conductive fill surrounding each tube.

Temperature of the flowing liquid is controlled to maintain each battery at a selected temperature by a first heat exchanger, which preferably obtains heat from engine coolant in the vehicle having the battery or batteries therein.

Optionally, the battery enclosure may have a second heat exchanger to cool the liquid, by using refrigerant in an air conditioning system of the vehicle.

The battery enclosure preferably controls the selection of the appropriate heat exchanger in accordance with temperature requirements of each respective battery.

Structurally, the battery enclosure is configured to prevent each battery from leaving its respective cradle in the event of an accident involving the vehicle having the battery or batteries. When multiple battery cradles are provided, they may optionally be interconnected with rods or other connectors extending through the walls of the battery enclosure.

The thermally managed enclosure preferably includes an intake manifold carrying heating or cooling fluid to the fluid pipes in each passageway trough of each cradle, then out through an outlet manifold and then on through respective external heat exchangers and pumps in the vehicle, to form a closed loop heating/cooling system for the batteries in the thermally managed enclosure.

While the preferred embodiment includes the fluid filled tube in a passageway trough at the bottom of the cradle having side walls, it is noted that the cradle may be of any geometric configuration, even with one or more curved walls, so long as the adjacent fluid filled passageway trough is in intimate contact with a wall of the respective cradle.

In operation of a preferred embodiment, the temperature of a battery in a powered motor vehicle is controlled by:

a) securing the battery within a respective cradle in the vehicle, wherein the cradle has walls and a bottom region of thermally conductive material, with a bottom wall of the cradle having a passageway trough containing a tube;

b) flowing heating or cooling liquid through the tube at a temperature to regulate the temperature of the respective battery;

c) heating the liquid as required by exchanging heat with engine coolant or other source in the vehicle;

e) cooling the liquid as required by exchanging heat with refrigerant in an air conditioning system on board the vehicle; and f) controlling the heating and cooling of the liquid in a closed loop, in accordance with the temperature requirements of the respective battery.

When multiple batteries are used, there are either placed adjacent to one another in a single cradle, or placed in multiple cradles of one or more batteries.

BRIEF DESCRIPTION OF THE DRAWINGS

The present invention can best be understood in connection with the accompanying drawings. It is noted that the invention is not limited to the precise embodiments shown in drawings, in which:

FIG. 1 is an end view of a single battery-width cradle showing the fluid tube for thermal management;

FIG. 2 is an end view of three battery cradles of FIG. 1 bonded together to form a three battery-width tray;

DETAILED DESCRIPTION OF THE PREFERRED EMBODIMENT

Figure 3:
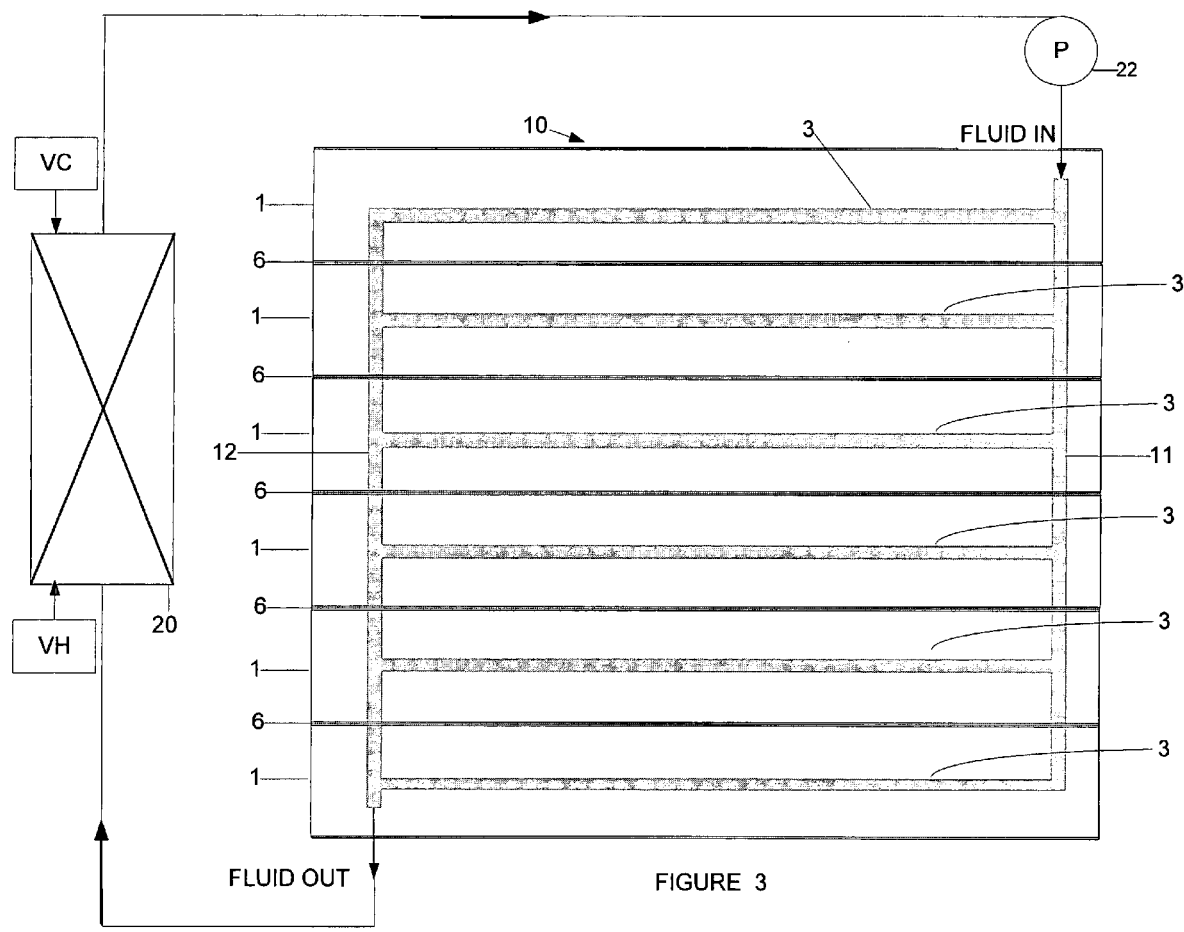
FIG. 3 is a top plan view of an unpopulated multi-battery tray showing the location of fluid manifolds and battery cradle fluid tubes, and, FIG. 3A is a top plan view of an alternate embodiment for an unpopulated multi-battery tray showing the location of fluid manifolds and battery cradle fluid tubes, and, FIG. 4 is a top plan view of the battery cradle of FIG. 3 populated with an array of batteries.

FIG. 1 is an illustration of a single battery cradle 1. The cradles are heated and cooled via an integral fluid loop. The battery cradle 1 has been designed to accommodate a fluid loop. Each cradle 1 has a lower pocket trough 1a, which supports the placement of tubing 3. The tubing 3 is adhered to the battery cradle 1 in order to maximize thermal conductivity under cooling or heating conditions. The cradle shape, size, and material are based on the battery type (i.e. Pb-Acid, NiMH, Li-based batteries, etc).

FIG. 2 is an illustration of multiple cradles 1 being used in a multi-battery configuration. As described, multiple cradles 1 are bonded together to form a battery tray 7 having multiple batteries 2. Another object of the invention is the method of adhesion to facilitate thermal equalization between all batteries 2 within an individual cradle 1 or set of cradles 1 forming a tray 7.

With specific attention to the drawings, FIG. 1 is an end view of a single battery-width cradle 1 with form-fitting housing 5 which closely fits around batteries 2. Fluid tube 3 carries the pumped working fluid (typically water-glycol solution, although any heat exchanging gas or liquid may be employed) to heat or cool batteries 2. A thermally conductive fill 4 around tube 3 in a lower pocket trough 1*a* insures efficient heat transfer in either direction to batteries 2.

FIG. 2 shows an end view of three single-width cradles 1 bonded together at adjacent walls 6 to form a three battery-width tray 7.

FIG. 3 is a top view of a battery tray with six cradles 1 bonded together at five adjacent walls 6 to form battery tray 10. This illustration is not populated with batteries, but the layout of the fluid conduits is shown. Intake manifold 11 carries thermally conditioned working fluid to fluid tubes 3 in each trough 1*a* of each cradle 1 and then out through outlet manifold 12 and then on through one or more sets of external heat exchangers 20 and pumps 22 connected to either the vehicle's heating system VH and/or the vehicle's cooling system VC, to form a closed loop heating/cooling system for the batteries 2.

Figure 3A:
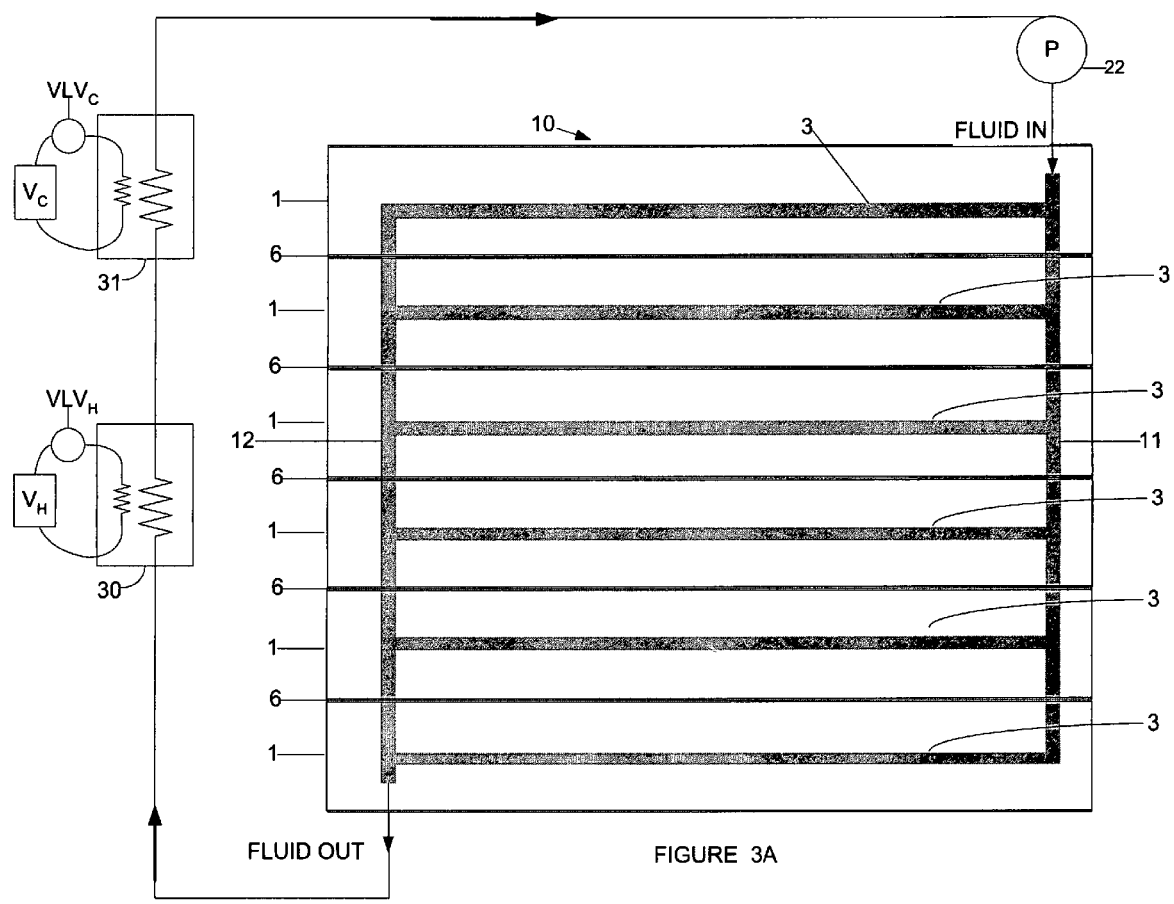

FIG. 3A is a top view of a battery tray with six cradles 1 bonded together at five adjacent walls 6 to form battery tray 10. This illustration is also not populated with batteries, but the layout of the fluid conduits is shown. Intake manifold 11 carries thermally conditioned working fluid to fluid tubes 3 in each trough 1a of each cradle 1 and then out through outlet manifold 12 and then on through two heat exchangers 30 and 31 in series. External heat exchanger 30 is for heating and external heat exchanger 31 is for cooling. Heat exchanger 30 is selectively coupled with vehicle heating system VH, via electrically operated valve (or circulator) VLVH. Heat exchanger 31 is selectively coupled with vehicle air conditioner system VC via electrically operated valve (or circulator) VLVC.

Figure 4:
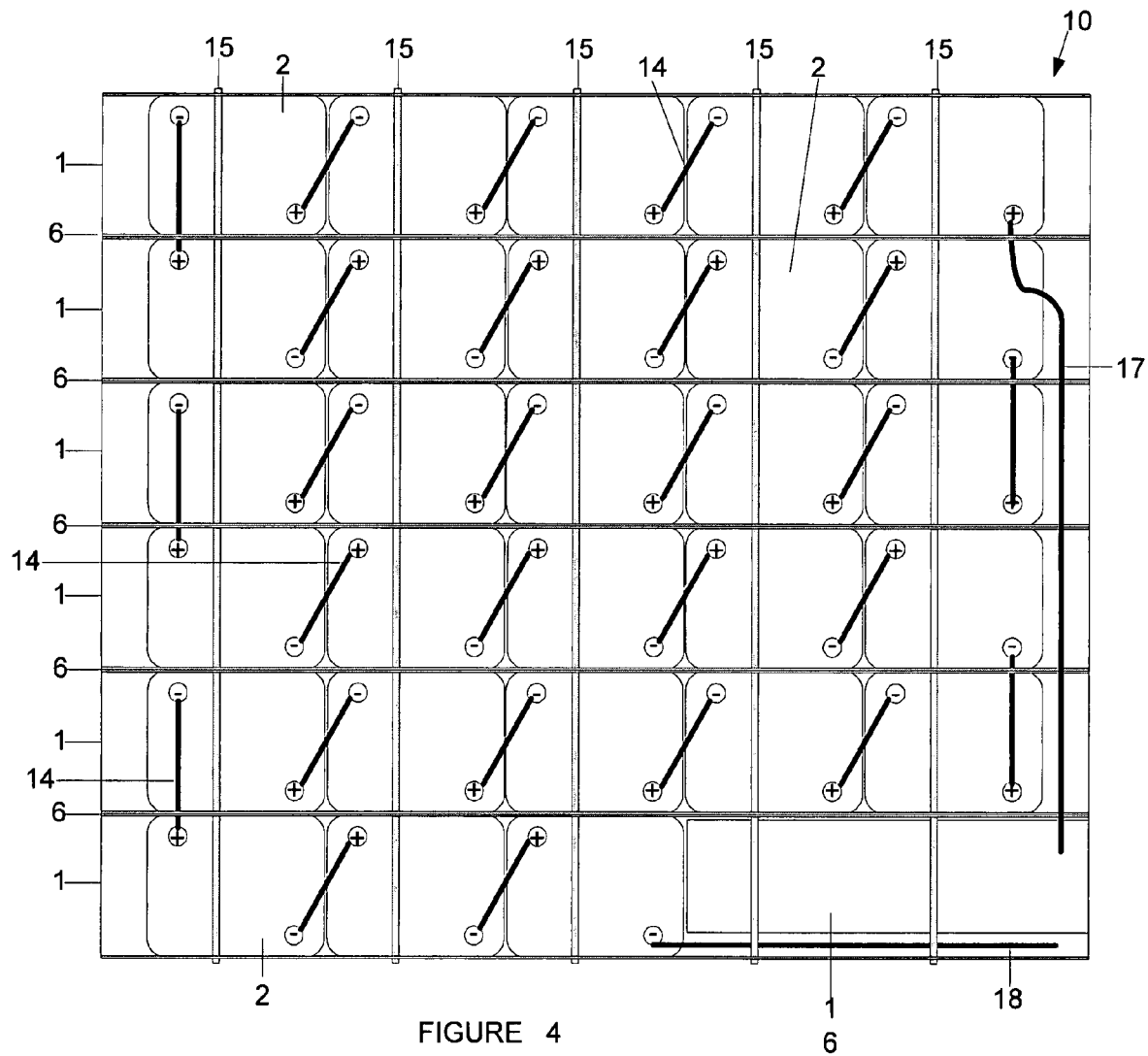

Further with respect to FIG. 3A, only one valve VLVH or VLVC is opened at any one time for heating or cooling respectively. If the respective valve VLVH or VLVC is not selected, then the main loop flow though that unselected heat exchanger does not appreciably the affect the temperature of the fluid. In other words, the main loop goes through both heat exchangers at any time, but if the valve for one of the heat exchangers is closed, then only one of the valves, either valve VLVH or VLVC, is open. After the heat exchange, then fluid is pumped by pump 22 to the battery enclosure, to form a closed loop heating/cooling system for the batteries 2. FIG. 4 is a top view of tray 10 as populated with 28 batteries 2. They are wired via jumpers 14 into a series connection with interface power cables 17 (+) and 18 (−). Obviously any parallel or series/parallel connections can be supported by battery tray 10; the series connection shown is simply an illustration of one possible configuration. Note that there is space for thirty batteries 2 in tray 10 but only 28 are required. Two-battery space filler 16 is introduced to keep batteries 2 from shifting. In other battery trays with different battery population requirements, one or more spacers of a variety of sizes (in multiples of unit battery size) might be incorporated. The side walls of housings 5 of battery cradles 1 are perforated with holes which are aligned in registration when assembled into trays such as 10. These are used to accommodate locking rods 15 which secure the top of each battery 2 to tray 10. This prevents batteries 2 from falling out of tray 10 even in the event of a vehicle roll-over.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

We claim:

1. A thermally managed battery enclosure in a powered vehicle comprising:
    a) at least one cradle of thermally conductive material containing at least one battery;
    b) said at least one cradle having a bottom wall and side walls closely fitted to and in contact with said at least one battery;
    c) the bottom wall of said at least one cradle having a passageway trough formed below said bottom wall, said bottom wall forming a top wall of said passageway, said passageway containing a pipe for flowing heating or cooling fluid therethrough;
    d) said passageway trough being filled with a thermally conductive fill surrounding said pipe; and,
    e) means for controlling the temperature of said fluid to maintain said battery in accordance with temperature requirements of said battery comprising at least one heat exchanger for obtaining heating or cooling fluid from heating and cooling systems, respectively, in said vehicle.

2. The thermally managed enclosure of claim 1 having a plurality of multiple cradles for batteries, and at least one battery occupying a single cradle of each of said plurality of multiple cradles.

3. The thermally managed enclosure of claim 2 wherein said battery enclosure is in the form of a monocoque battery tray formed by at least one of bonding or welding said multiple cradles at their adjacent sides.

4. The thermally managed enclosure of claim 2 in which said cradles are positioned side by side with fluid pipes in adjacent cradles parallel to each other.

5. The battery enclosure of claim 1 further comprising an intake manifold carrying said heating or cooling fluid to said fluid pipe in said cradle and then out through an outlet manifold and then on through respective external heat exchangers and pumps to form a closed loop heating/cooling system for said batteries in said thermally managed enclosure.

6. The battery enclosure of claim 1 having means to prevent said battery from leaving said cradle in the event of an accident involving said vehicle.

7. The battery enclosure of claim 6 wherein means to prevent said battery from leaving said cradle comprises said side walls being perforated with holes, which said holes are aligned in registration when assembled, said holes accommodating respective locking rods securing a respective top of each said battery to said battery enclosure.

8. The battery enclosure of claim 1 wherein said at least one heat exchanger is a plurality of heat exchangers for obtaining heating or cooling fluid from heating and cooling systems, respectively, in said vehicle.

* * * * *